(12) United States Patent
Farr et al.

(10) Patent No.: US 7,228,258 B2
(45) Date of Patent: Jun. 5, 2007

(54) REAL ASSET-TO-SIMULATED ENVIRONMENT BRIDGE AND METHOD

(75) Inventors: Donald B. Farr, O'Fallon, MO (US); Thomas G. King, O'Fallon, MO (US); Joel J. Maleport, O'Fallon, MO (US)

(73) Assignee: The Boeing Company, Chicago, IL (US)

( * ) Notice: Subject to any disclaimer, the term of this patent is extended or adjusted under 35 U.S.C. 154(b) by 553 days.

(21) Appl. No.: 10/712,158

(22) Filed: Nov. 12, 2003

(65) Prior Publication Data

US 2007/0100589 A1    May 3, 2007

(51) Int. Cl.
*G06F 17/10* (2006.01)
(52) U.S. Cl. ............................................. 703/2; 434/30
(58) Field of Classification Search ................. 703/13, 703/2; 342/357.06; 434/30; 472/59
See application file for complete search history.

(56) References Cited

U.S. PATENT DOCUMENTS

| | | | | |
|---|---|---|---|---|
| 5,377,116 A | * | 12/1994 | Wayne et al. ............... | 700/175 |
| 5,421,728 A | * | 6/1995 | Milden .......................... | 434/5 |
| 6,234,799 B1 | | 5/2001 | Lin | |
| 6,256,602 B1 | * | 7/2001 | Ellis et al. ....................... | 703/8 |
| 6,319,008 B1 | | 11/2001 | Mickelson et al. | |
| 7,003,475 B1 | * | 2/2006 | Friedland et al. .............. | 705/9 |

* cited by examiner

*Primary Examiner*—Albert W. Paladini
(74) *Attorney, Agent, or Firm*—Harness, Dickey & Pierce, P.L.C.

(57) ABSTRACT

The present disclosure is directed to a training system comprising at least one real asset having real asset data, a transceiver coupled to the real asset, at least one simulator adapted to simulate an asset; and a bridge coupled between the at least one simulator and the transceiver, whereby training can be carried out using both the at least one real asset and the simulated asset in concert. The bridge uses a piecewise polynomial interpolation algorithm to transform the real asset data into the proper format for use in the simulated environment. The present disclosure is also directed to the real asset-to-simulated environment bridge itself and a method of providing a bridge between at least one real asset and a simulated environment.

32 Claims, 5 Drawing Sheets

REAL ASSET-TO-SIMULATED ENVIRONMENT BRIDGE AND METHOD

BACKGROUND

The present disclosure is directed generally to a training system a method for a moving asset and in particular, to a real asset-to-simulated environment bridge and method.

The role of an airline is to safely transport passengers from one destination to another. Airlines are continuously working to improve safety and performance. Their efforts fall into two major categories: aircraft maintenance and aircraft operations. With respect to the latter, the Federal Aviation Authority requires pilots to be licensed and have minimum levels of specified training and experience. Such training typically includes the use of flight simulators which essentially replicate the flying experience. These simulators operate under one of several simulation communication protocols, such as the Distributed Interactive Simulation (DIS) protocol, the High-level Architecture (HLA) protocol and the Training Enabling Architecture (TENA) protocol. Simulators are also heavily used in connection with military aircraft for military training purposes. For example, in 2000, the Boeing Company linked its Joint Strike Fighter (JSF) simulator in St. Louis with four high-fidelity, networked F-15 simulators at Eglin Air Force Base, Fla. in order to conduct real-time cooperative training exercises.

Simulators are an essential technology since they allow safety-critical operations to be examined in real-world settings without the associated risk. However, to date, such training exercises have only allowed for simulated assets and not real assets. As a result, the training experience is less realistic. In addition, since the real asset can only be simulated, the simulator must change each time the real asset is upgraded or modified. This is not only costly, but also results in a substantial lag time during which the simulated environment is out of date. Moreover, since only a certain level of training can be accomplished in a simulator, the integration of a flight asset with the simulation environment will greatly enhance the education level of the users. The interaction between simulated and flight assets is inhibited by the inability to share critical information from the flight control system and the mission computer. Training systems do not connect to live assets because of the limitation of the communication connectivity. In particular, live systems do not communicate using the DIS or HLA protocols to provide the true interaction with simulated systems. Rather, the only method currently available to get platform flight parametric data in the simulated environment is to integrate a telemetry pod, which requires extensive support equipment and facilities. In such a case, however, the training system is still limited to the use of only simulated assets that operate under the same protocol. Accordingly, there is a need to bridge or connect the flight/navigation parameters and other critical data of a real flight asset into the simulated environment in order to provide the ability to carry out coordinated training exercises with both real and simulated assets acting in concert across a plurality of different simulation communication protocols.

SUMMARY

A training system comprising at least one real asset having real asset data, a transceiver coupled to the real asset, at least one simulator adapted to simulate an asset, and a bridge coupled between the at least one simulator and the transceiver, whereby training can be carried out using both the at least one real asset and the simulated asset in concert is disclosed. The bridge comprises a computer readable medium having computer readable program code embodied thereon. The computer readable program code comprises a piecewise polynomial interpolation algorithm. In particular, the computer readable program code, when executed, computes an equation for a curve to fit the real asset data received by the bridge, interpolates the real asset data based on the computed curve, and repeats the computing and interpolating steps until no new real asset data is received by the bridge such that a plurality of curves representing the motion of the real asset are created. It may further dead reckon the real asset data and interpolate the real asset data based on the computer curves if the bridge stops receiving the real asset data. It may also smooth each curve.

The system may further comprise a simulator adapted to simulate a strike target asset comprising at least one of munitions, tanks and missile launchers. The bridge may further comprise a recorder adapted to record the real asset data, and the recorder may comprise a mechanism for playing back the real asset data recorded by the recorder.

The bridge may also comprise a filter adapted to restrict the flow of real asset data and simulated asset data therethrough. The bridge is preferably configured to support a plurality of simulation communication protocols, wherein the simulation communication protocols comprise at least one of a distributed interactive simulation protocol, a high-level architecture protocol and a training enabling architecture protocol.

The system further comprises at least one communication link between the transceiver and the bridge, and the bridge may be configured to support a plurality of different communication links, wherein the communication links comprise at least one of a link 16, link 4A, link 22, VMF, SINCGARS/ESIP, Havequick, T-ACELINT, and DAMA. The communication between the real asset and the bridge is preferably two-way. In one embodiment, the real asset is a flight asset.

A real asset-to-simulated environment bridge, in accordance with the foregoing is also disclosed.

A method of providing a bridge between at least one real asset having real asset data and a simulated environment is also disclosed. The method comprises receiving a set of real asset data periodically from the real asset, computing an equation for a curve to fit the real asset data received, interpolating real asset data based on the computed equation to create a curve and repeating the steps of computing and interpolating until no new real asset data is received such that a plurality of curves representing the motion of the real asset are created. The method further comprises dead reckoning the real asset data and interpolating the real asset data based on the computed curves when the bridge stops receiving the real asset data. The method may further comprise smoothing each curve, recording the real asset data, playing back the recorded real asset data, filtering the flow of data between the real asset and the simulated environment, and/or simulating a strike target asset comprising at least one of munitions, tanks and missile launchers.

DETAILED DESCRIPTION OF THE VARIOUS EMBODIMENTS

Figure 1:
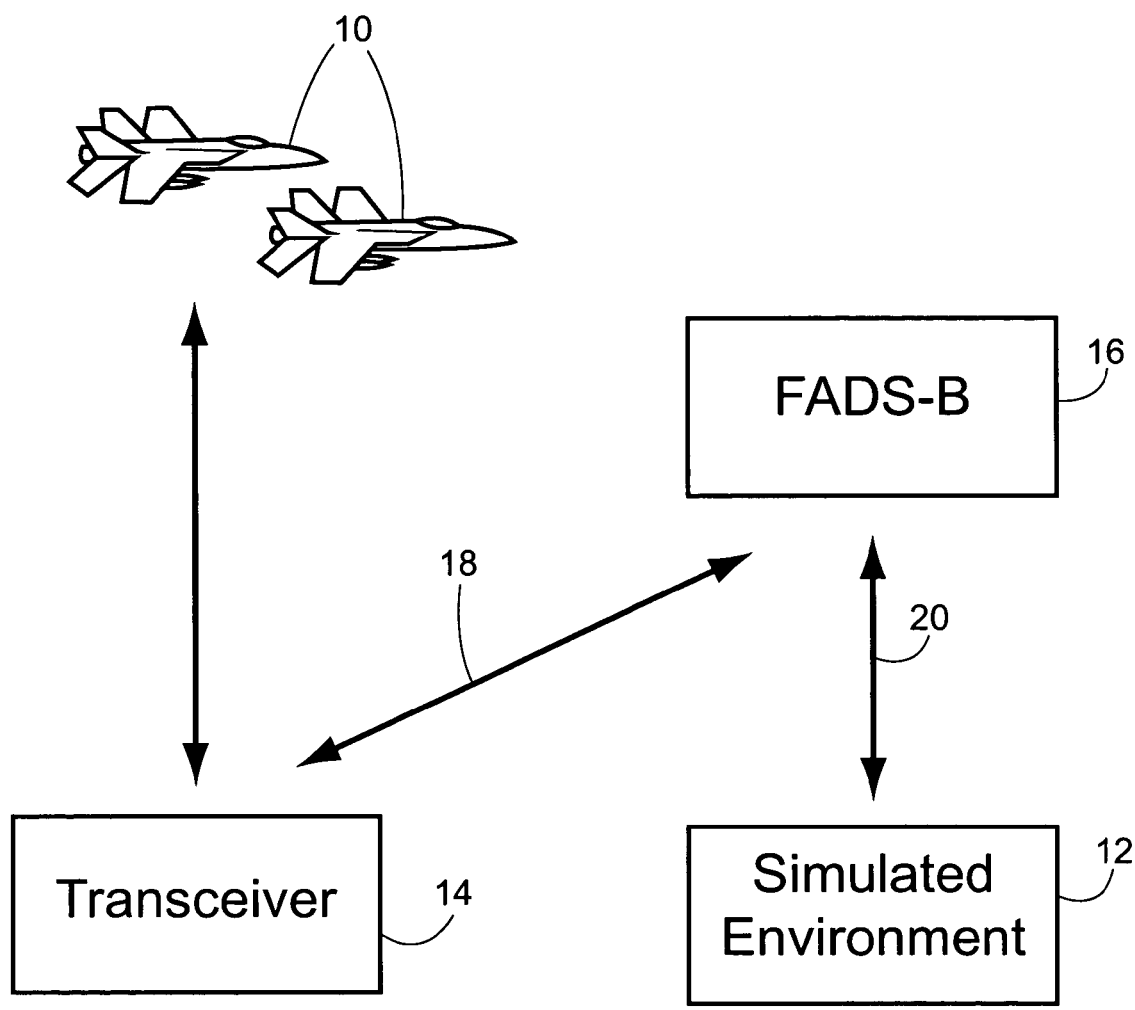
FIG. 1 is a block diagram showing an application of the present disclosure.

While the present disclosure will be described in connection with a flight training system having flight assets, it can be appreciated that the present disclosure applies to any training application involving a moving asset. As shown in FIG. 1, a typical training system in accordance with the present disclosure includes one or more real flight assets 10 which communicate with a simulated environment 12 through a transceiver 14 and a flight asset-to-simulator bridge 16. The simulated environment 12 may include one or more simulators (not shown). In the case of multiple simulators, they may be distributed across the same network or different networks. One or more communication links 18 connect the transceiver 14 to the bridge 16 and one or more communication links 20 connect the bridge 16 to the simulated environment 12. Communication links 18 are preferably a platform supported digital communication channel, but may be any medium which allows information from the real assets 10 to be communicated to the bridge 16 and vice-versa. Communication links 20 are preferably a platform supported digital communication channel, but again may be any medium which allows information from the bridge 16 to be communicated to the simulated environment 12 and vice-versa.

The transceiver 14 can be controlled in one of two ways. In one embodiment, the bridge 16 operates in a master mode communicating directly with the transceiver 14, and is responsible for the initialization and control of the hardware. In another embodiment, the bridge 16 operates in a slave mode, and an additional piece of software is used as the master to control the transceiver 14. For this mode of operation, the bridge 16 is slaved to the software controlling the transceiver 14 and receives periodic updates from the master. Any information that needs to be sent back through the communication link 18 is first transmitted to the master, which subsequently relays the information over the communication link 18.

Figure 3:
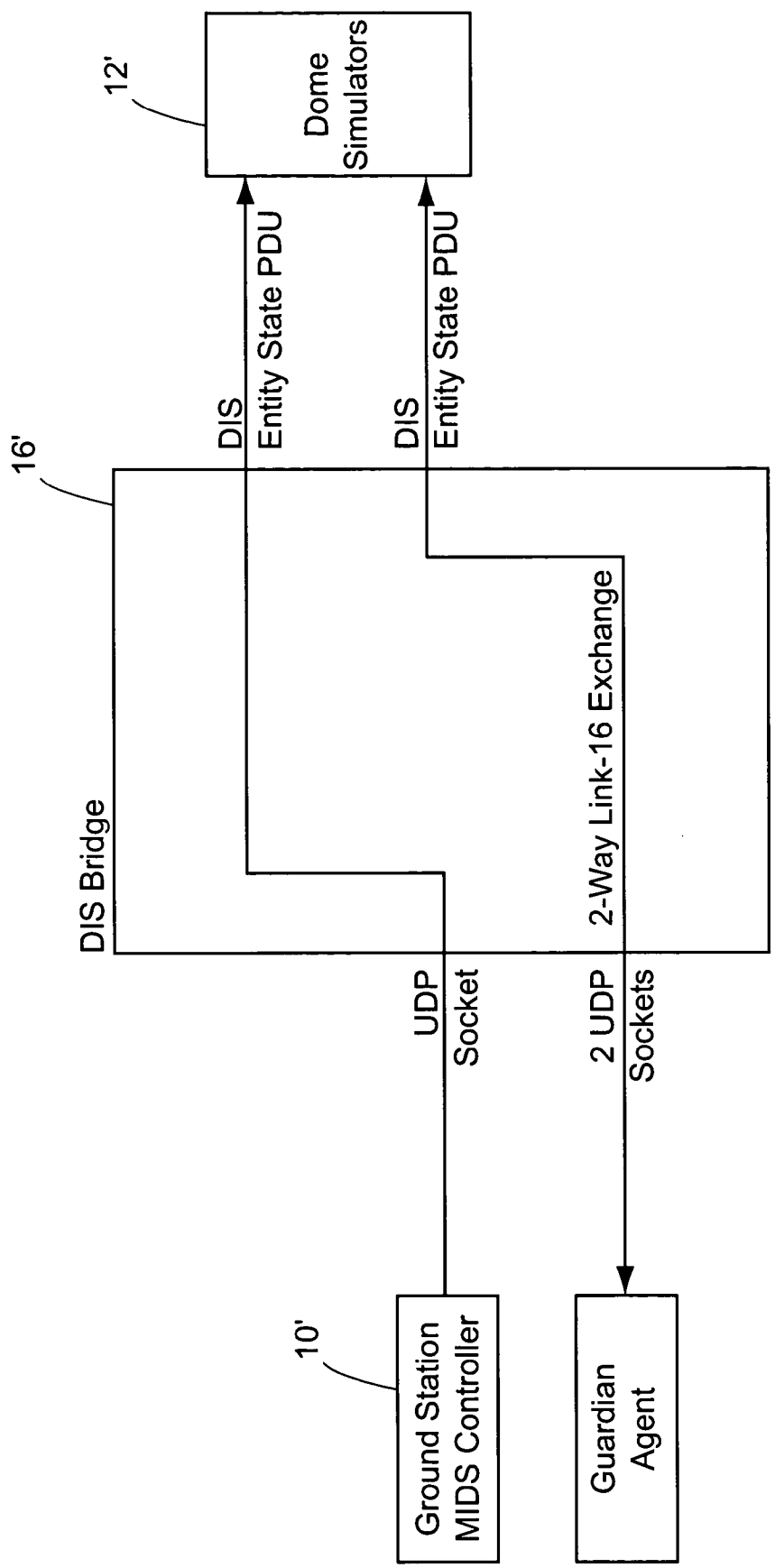
FIG. 3 is a schematic of the interfaces of the bridge of FIG. 1 for a training exercise involving an F-1 real asset, a guardian agent, and F-15 and F-18 dome simulators.

The real asset data, which includes without limitation flight dynamic and platform critical data, is received by the transceiver 14 from the flight assets 10 and transmitted across the communication links 18 to the bridge 16 where it is transformed into the proper format for use in the simulated environment 12. One example of the interfaces of the bridge for a training exercise involving an F-1 real asset, a guardian agent, and F-15 and F-18 dome simulators is shown in FIG. 3. The bridge 16 translates the real asset data into the geometric coordinate system of the simulated environment, and smooths the real asset data to provide it to the simulated environment at a periodic rate.

Figure 2:
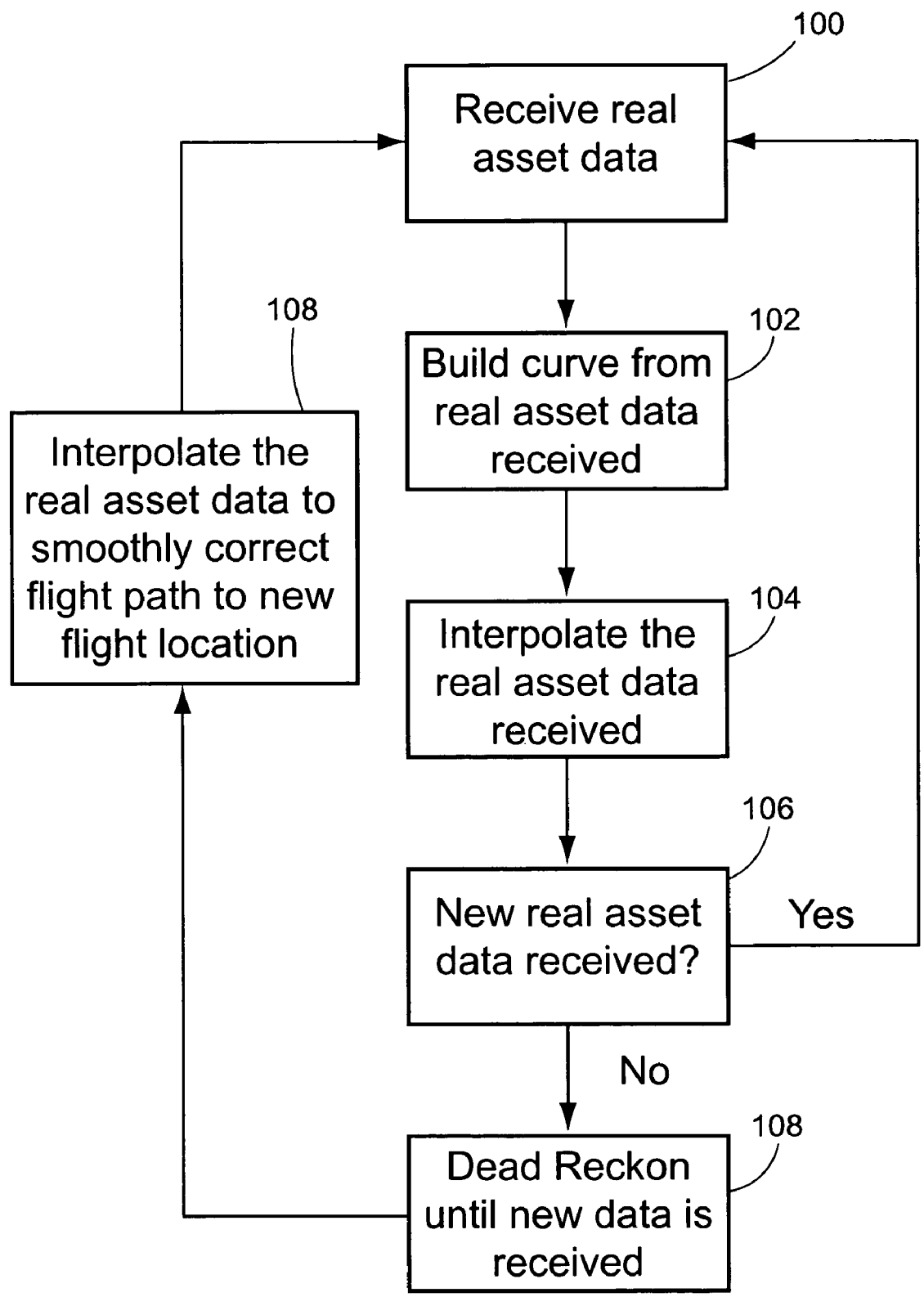
FIG. 2 is a flow chart of one embodiment of the operation of the bridge of FIG. 1.
Figure 4:
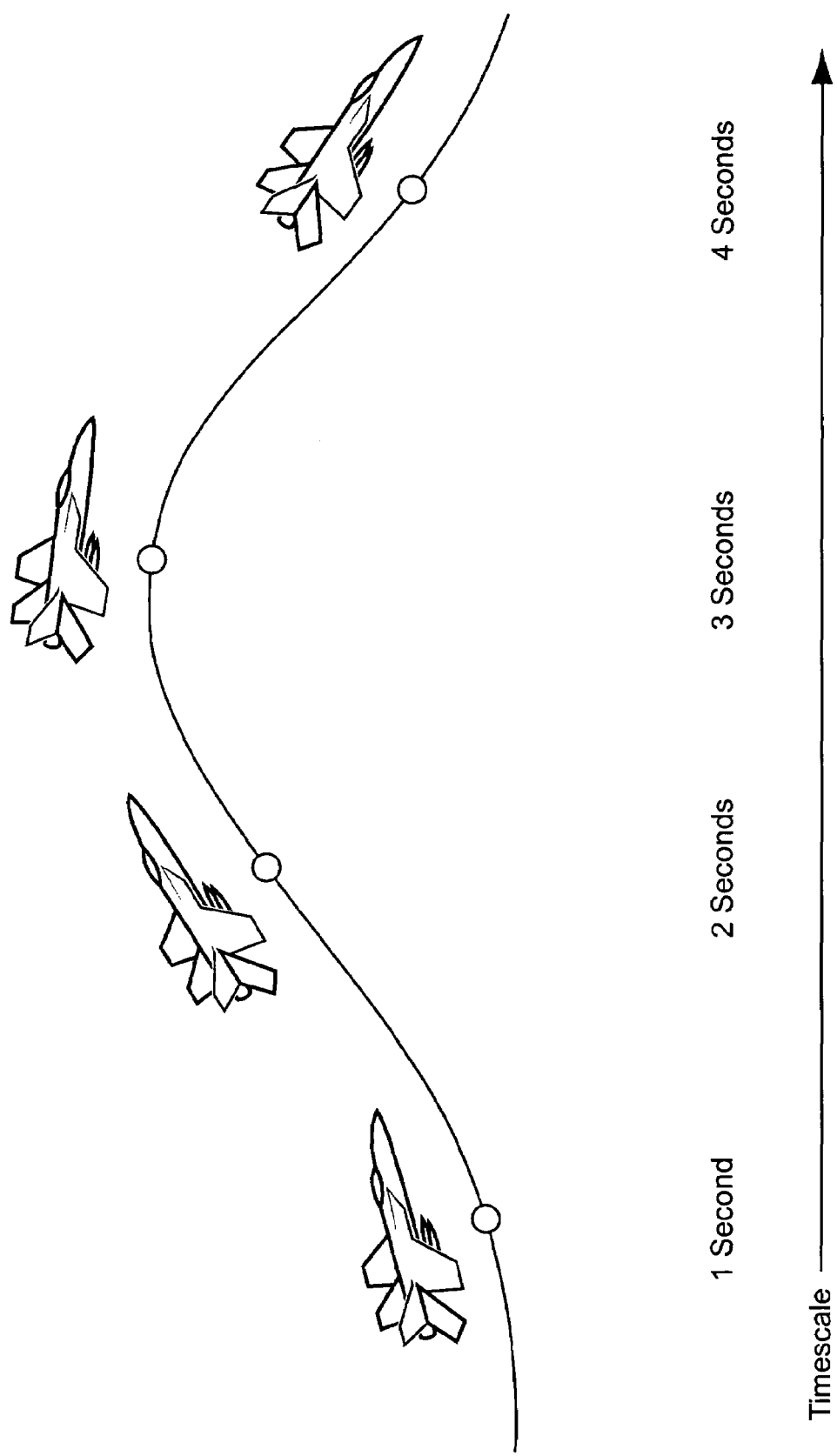
FIG. 4 is a diagram showing the simulation of a real asset using the bridge of FIG. 1.
Figure 5:
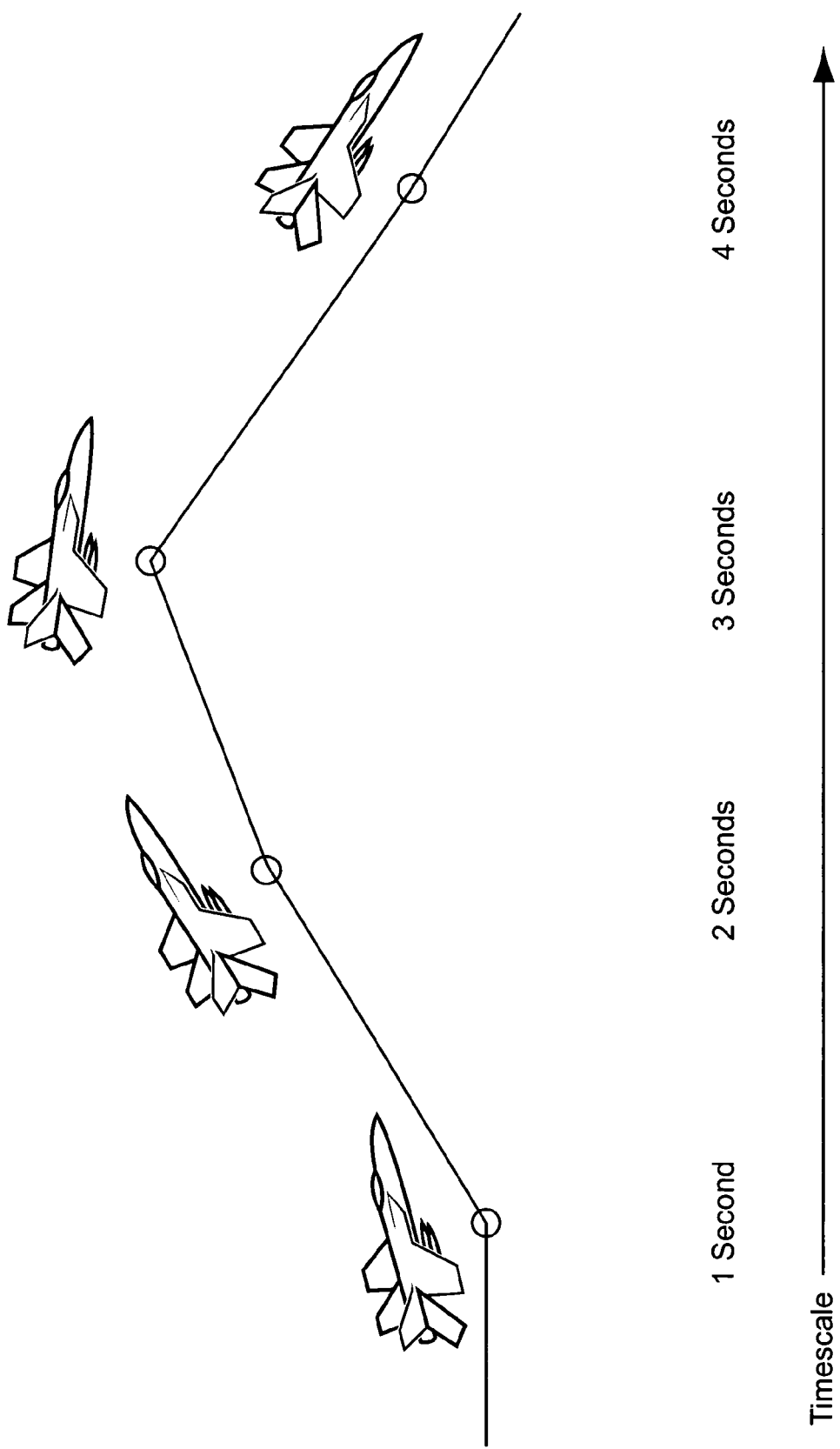
FIG. 5 is a diagram showing the simulation of a real asset without the use of the bridge of FIG. 1.

The flow of trajectory information being transmitted by the real asset, however, is often low-fidelity data (i.e. the data is constrained by the available bandwidth), while the information in the simulated environment is high-fidelity data. The bridge 16 employs a piecewise polynomial interpolation algorithm, as shown in FIG. 2, to alleviate this problem. Essentially, this algorithm helps fill in the gaps in the real asset data being received from the real asset. Specifically, at 100 the bridge 16 receives a set of real asset data periodically (in one embodiment, one set of data about every second). At 102, the bridge 16 then computes an equation for a curve to fit the real asset data received. The type and order of the curve may vary depending on the real asset data received. While the bridge 16 is waiting for new real asset data to arrive, at 104 it interpolates the position of the real asset, using the previously computed curve equations. At 106, the bridge checks whether any new real asset data has been received. If so, this process is repeated as necessary so as to create a series of curves. If the bridge 16 stops receiving real asset data, at 108 it uses dead reckoning algorithms to the extent necessary to account for any dropouts of the real asset. At 110, the bridge further interpolates the real asset data to smoothly correct the flight path to new flight location. In order to make sure that the resulting curve is smooth (i.e., does not consist of a bunch of disjointed segments), the bridge 16 may use the velocities (i.e., the slope or first derivative) at the end points of each curve to ensure that the transition is smooth from one curve segment (or piece) to the next. With such a configuration, the bridge 16 can present accurate fluid motion of the real asset at high data rates in the simulated environment even though the information being received by the real asset is at a low data rate. The bridge 16 may also be configured to provide additional filtering to smooth out any spikes in the real asset data received, as well as algorithms to handle periodic dropouts in real asset data to ensure the fluid motion of the real asset is not disturbed. FIG. 4 shows the simulation of a real asset using the bridge of the present disclosure, while FIG. 5 shows the simulation of a real asset without the use of such a bridge.

The bridge 16 may be implemented in software and/or hardware. The bridge 16 is currently implemented as a Microsoft Windows based application that runs on a standard desktop PC. The bridge 16 is configurable based on the real assets, the communication links 18 and 20 and simulated environment 12 making up the training system. In order to facilitate full coordination during training exercises, the bridge 16 preferably supports multiple and different communication links 18 through which information can be exchanged in real time. These include but are not limited to, SINCGARS/ESIP, Havequick, Link 16, Link 4A, Link 22, VMF, TACELINT and DAMA. The exchange of information over each communication link 18 is preferably two-way allowing the real assets to view and respond to the same information that is being used in the simulated environment 12. Bridge 16 also preferably supports full articulation of the various components of the real assets 10 including without limitation, munitions, flaps, landing gear, and canopies. The bridge may also include the ability to record and playback information being received by the real asset. This capability frees up the real asset and allows the information to be repeated any number of times at any time. As a part of the playback capability, the bridge preferably includes support for typical playback modes including without limitation fast-forward, reverse, and pause. The bridge 16 may also include filtering capabilities which allow it to restrict the flow of information to or from communication link 18 and/or 20. For example, since the simulated world often does not conform to the rules and restrictions of live operations, it may become necessary to restrict message traffic being sent out by the simulated environment. Also, some platforms may not support particular messages. Thus, this feature helps prevent such platforms from receiving data that they cannot handle properly.

Information is exchanged in the simulated environment 12 through one or more simulation communication protocols. The bridge 16 constructs the messages needed to depict the real asset in the simulated world in accordance with the applicable protocol. In a preferred embodiment, the bridge 16 provides support for a plurality of simulation communication protocols including, without limitation, the DIS protocol, the HLA protocol and the TENA protocol. As a result, the present disclosure allows for the operation of a simulated training exercise across a plurality of simulators using dissimilar protocols concurrently.

In another embodiment, the bridge 16 is configured to simulate a strike target asset that would otherwise not be available such as, for example, opposing forces, munitions, tanks or missile launchers. For example, in the case of munitions, using the current position of the real asset and the intended destination of the munition, the bridge 16 uses the piecewise polynomial interpolation previously described herein to compute the location and trajectory of the munition in flight. This capability allows the strike target asset to strike against entities in the simulated environment while alleviating the need to drop munitions in the real world. This feature provides a significant benefit since it would otherwise be impossible to train individuals with respect to such assets.

While the present disclosure has been described by reference to specific embodiments and specific uses, it should be understood that other configurations and arrangements could be constructed, and different uses could be made, without departing from the scope of the disclosure as set forth in the following claims. In particular, the disclosure can be used in connection with any real asset and simulated environment.

We claim:

1. A training system to train a user, comprising:
   at least one real asset having real asset data;
   a transceiver coupled to the real asset;
   at least one simulator that simulates an asset to enable a user to train to use the asset; and
   a bridge coupled between the at least one simulator and the transceiver that facilitates the training and transmits the real asset data to the simulator, with the simulator using the real asset data to simulate the asset to train the user.

2. The system of claim 1, wherein the bridge comprises a computer readable medium having computer readable program code embodied thereon.

3. The system of claim 2, wherein the computer readable program code comprises a piecewise polynomial interpolation algorithm.

4. The system of claim 2, wherein the computer readable program code, when executed, computes an equation for a curve to fit the real asset data received by the bridge, interpolates the real asset data based on the computed curve, and repeats the computing and interpolating steps until no new real asset data is received by the bridge such that a plurality of curves representing the motion of the real asset are created.

5. The system of claim 4, wherein the computer readable code, when executed, dead reckons the real asset data and interpolates the real asset data based on the computed curves when the bridge stops receiving the real asset data.

6. The system of claim 5, wherein the computer readable code, when executed, smoothes each curve created by the bridge.

7. The system of claim 1, wherein the bridge further comprises a simulator adapted to simulate a strike target asset comprising at least one of munitions, tanks and missile launchers.

8. The system of claim 1, wherein the bridge comprises a recorder adapted to record the real asset data.

9. The system of claim 8, wherein the recorder comprises means for playing back the real asset data recorded by the recorder.

10. The system of claim 1, wherein the bridge comprises a filter adapted to restrict the flow of real asset data and simulated asset data therethrough.

11. The system of claim 1, wherein the bridge is configured to support a plurality of simulation communication protocols, and wherein the simulation communication protocols comprise at least one of a distributed interactive stimulation protocol, a high-level architecture protocol and a training enabling architecture protocol.

12. The system of claim 1, further comprising at least one communication link between the transceiver and the bridge, wherein the bridge is configured to support a plurality of different communication links, and wherein the communication links comprise at least one of a link 16, link 4A, link 22, VMF, SINCGARS/ESIP, Havequick, T-ACELINT, and DAMA.

13. The system of claim 12, wherein communication between the real asset and the bridge is two-way.

14. The system of claim 1, wherein the real asset is at least one of a flight asset and a strike target asset.

15. A real asset-to-simulated environment bridge, comprising:
   a computer readable medium having computer readable program code embodied thereon which when executed couples at least one real asset to a simulated environment; and
   when executed, the computer readable medium computes an equation for a curve to fit real asset data received by the bridge, interpolates the real asset data based on the computed curve, and repeats the computing and interpolating steps until no new real asset data is received by the bridge such that a plurality of curves representing the motion of the real asset are created.

16. The real asset-to-simulated environment bridge of claim 15, wherein the computer readable program code comprises a piecewise polynomial interpolation algorithm.

17. The real asset-to-simulated environment bridge of claim 15, wherein the computer readable program code, when executed, dead reckons the real asset data and interpolates the real asset data based on the computed curves when the bridge stops receiving the real asset data.

18. The real asset-to-simulated environment bridge of claim 17, wherein the computer readable code, when executed, smoothes each curve.

19. The real asset-to-simulated environment bridge of claim 15, wherein the bridge comprises a recorder adapted to record real asset data received from the real asset.

20. The real asset-to-simulated environment bridge of claim 19, wherein the recorder comprises means for playing back the real asset data recorded by the recorder.

21. The real asset-to-simulated environment bridge of claim 15, wherein the bridge comprises a filter adapted to restrict the flow of real asset data and simulated asset data therethrough.

22. The real asset-to-simulated environment bridge of claim 15, wherein the bridge is configured to support a plurality of simulation communication protocols, and wherein the simulation communication protocols comprise at least one of a distributed interactive simulation protocol, a high-level architecture protocol and a training enabling architecture protocol.

23. The real asset-to-simulated environment bridge of claim 15, wherein the bridge is configured to allow for two-way communication between the real asset and the simulated environment.

24. The real asset-to-simulated environment bridge of claim 15, wherein the bridge further comprises a simulator adapted to simulate a strike target asset comprising at least one of munitions, tanks and missile launchers.

25. The real asset-to-simulated environment bridge of claim 15, wherein the bridge is configured to support a plurality of communication links, wherein the communication links comprise at least one of a link 16, link 4A, link 22, VMF, SINCCARS/ESIP, Havequick, T-ALELINT and DMA.

26. A method of providing a bridge between at least one real asset having real asset data and a simulated environment, comprising:
 (1) receiving a set of real asset data periodically from the real asset;
 (2) computing an equation for a curve to fit the real asset data received;
 (3) interpolating real asset data based on the computed equation to create a curve;
 (4) repeating (3) and (4) until no new real asset data is received such that a plurality of curves representing the motion of the real asset are created; and
 (5) transmitting the motion of the real asset to the simulated environment.

27. The method of claim 26, further comprising dead reckoning the real asset data and interpolating the real asset data based on the computed curves when the bridge stops receiving the real asset data.

28. The method of claim 27, further comprising smoothing each curve.

29. The method of claim 26, further comprising recording the real asset data.

30. The method of claim 29, further comprising playing back the recorded real asset data.

31. The method of claim 26, further comprising filtering the flow of data between the real asset and the simulated environment.

32. The method of claim 26 wherein the real asset is at least one of a flight asset and a strike target asset.

* * * * *